United States Patent
Brown

(10) Patent No.: US 6,736,245 B2
(45) Date of Patent: May 18, 2004

(54) DAMPENING CYLINDER INCORPORATING STOP VALVE

(75) Inventor: Edmund W. Brown, Racine, WI (US)

(73) Assignee: Topper Industrial, Inc., Sturtevant, WI (US)

(*) Notice: Subject to any disclaimer, the term of this patent is extended or adjusted under 35 U.S.C. 154(b) by 0 days.

(21) Appl. No.: 10/364,047

(22) Filed: Feb. 10, 2003

(65) Prior Publication Data

US 2003/0155197 A1 Aug. 21, 2003

Related U.S. Application Data

(60) Continuation-in-part of application No. 09/769,590, filed on Jan. 25, 2001, which is a division of application No. 09/649,835, filed on Aug. 29, 2000, now Pat. No. 6,390,278.

(51) Int. Cl.[7] .................................... F16F 9/44
(52) U.S. Cl. .................. 188/313; 188/284; 188/300; 188/312
(58) Field of Search .............. 188/281, 282.4, 188/284, 285, 310, 313, 312, 317, 314.1, 316, 318, 300

(56) References Cited

U.S. PATENT DOCUMENTS

| 3,117,773 | A | | 1/1964 | Wallens et al. | |
|---|---|---|---|---|---|
| 3,142,363 | A | * | 7/1964 | Tamini | 188/300 |
| 4,191,280 | A | * | 3/1980 | Copperwheat | 188/300 |
| 4,786,034 | A | | 11/1988 | Heess et al. | |
| 4,969,643 | A | | 11/1990 | Kroeker et al. | |
| 5,161,653 | A | * | 11/1992 | Hare, Sr. | 188/300 |
| 5,617,961 | A | | 4/1997 | Konstant et al. | |
| 5,662,046 | A | | 9/1997 | Wright et al. | |

FOREIGN PATENT DOCUMENTS

GB       1257827       9/1969

* cited by examiner

*Primary Examiner*—Matthew C. Graham
(74) *Attorney, Agent, or Firm*—Boyle Fredrickson Newholm Stein & Gratz S.C.

(57) ABSTRACT

A dampening cylinder is provided. The dampening cylinder includes a cylindrical housing defining a cavity for receiving a fluid therein. A piston slidably extends through the cavity in the housing and includes a flange projecting radially therefrom. The flange is positioned within the cavity so as to divide the cavity in the housing into first and second portions. First and second flow control valves control the rate of flow of fluid between the first and second portions of the cavity in the housing, and hence, the rate at which the piston slides through the housing. An emergency stop valve is positioned in fluid communication with the fluid flowing between the first and second portions of the cavity in the housing. The stop valve is movable between a first open position for allowing the flow of fluid between the first and second portions of the cavity in the housing and a closed position for preventing the flow of fluid between the first and second portions of the cavity in the housing.

21 Claims, 9 Drawing Sheets

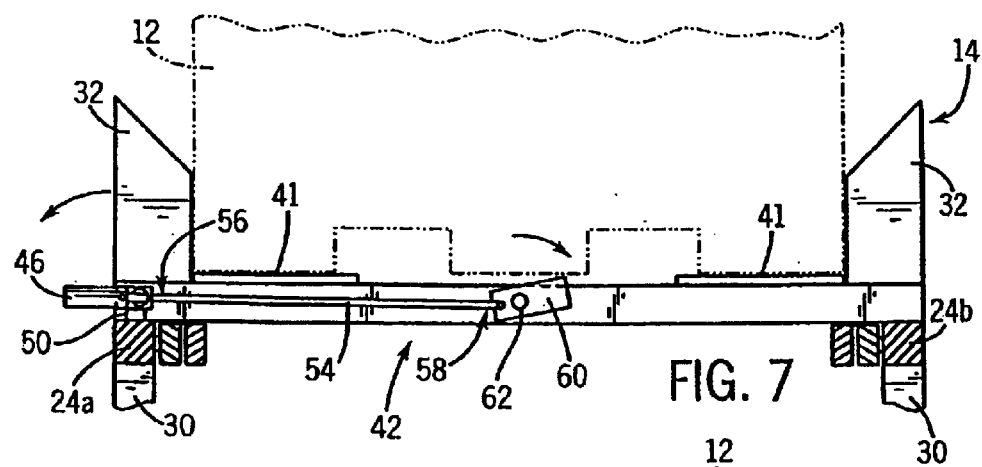
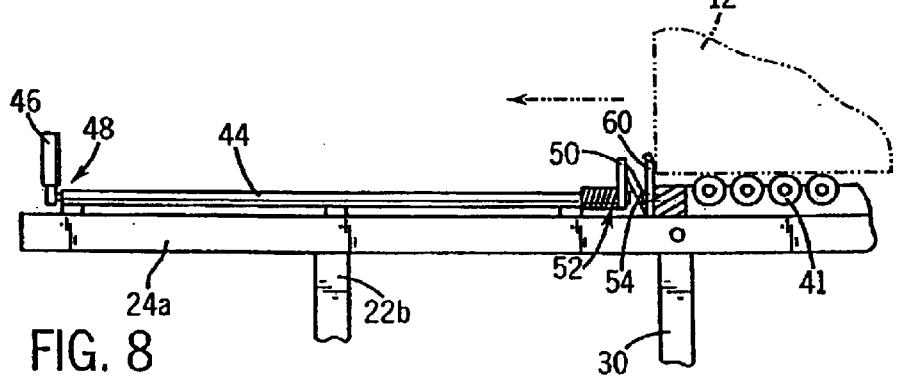
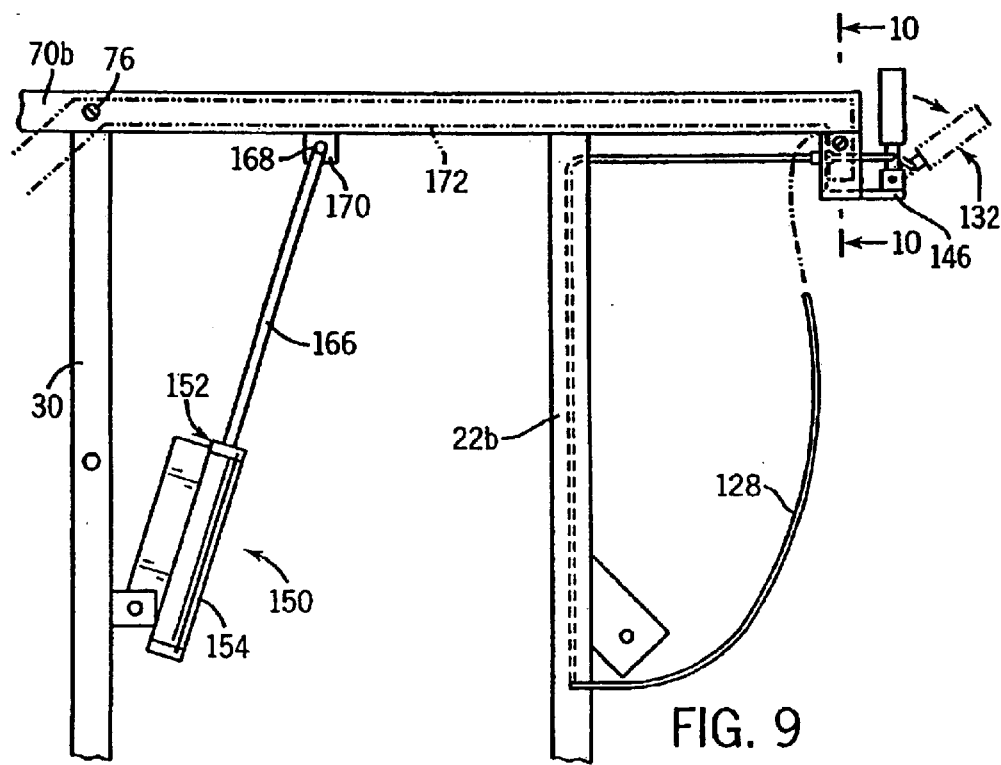

US 6,736,245 B2

DAMPENING CYLINDER INCORPORATING STOP VALVE

CROSS-REFERENCE TO RELATED APPLICATIONS

This is a continuation-in-part of Ser. No. 09/769,590, filed Jan. 25, 2001, and entitled "DAMPENING CYLINDER FOR TRANSFER MECHANISM," which is a divisional application of Ser. No. 09/649,835, filed Aug. 29, 2000, and entitled "TRANSFER MECHANISM FOR MULTIPLE LEVEL CONVEYOR." now U.S. Pat. No. 6,390,278.

FIELD OF THE INVENTION

This invention relates generally to transfer mechanisms for conveyors, and in particular, to a dampening cylinder for a transfer mechanism for transferring a load between an upper conveyor and a lower conveyor that incorporates an emergency stop valve.

BACKGROUND AND SUMMARY OF THE INVENTION

In order to transport materials and products throughout a factory or the like, conveyors are often used. Due to the floor space limitations in many factories, pairs of conveyors are often disposed in a vertically spaced relationship. For example, a delivery conveyor may be provided to deliver pallets or containers to a work station and a distribution conveyor, vertically spaced from the delivery conveyor, may be provided to transport such pallets or containers from the work station.

In order to convey the pallets or containers from the upper conveyor to the lower conveyor, complex load transfer mechanisms have been developed. These types of load transfer mechanisms often incorporate various types of hydraulic systems for raising and/or lowering the load between the delivery conveyor and the distribution conveyor. As such, these types of load transfer mechanisms are highly complicated and quite expensive.

Alternatively, simple mechanical types of load transfer mechanisms have been developed which allow a pallet or container to be transferred between an upper conveyor and a lower conveyor. By way of example, Konstant et al., U.S. Pat. No. 5,617,961 discloses a load transfer and return storage rack system which allows for wheel carts or empty pallets to be selectively or automatically transferred from a pair of feed rails to a pair of return rails. The system disclosed in the Konstant et al., '961 patent is intended to transfer empty carts or pallets between the feed rails and the return rails. As such, the system disclosed in the Konstant et al., '961 patent is not intended to deliver product to or distribute the product from a work station at the load transfer structure. Further, no mechanism is provided for dampening the movement of the load transfer system between the feed rails and the return rails. As such, transfer of a loaded cart or pallet between the feed rails and the return rail may cause damage to the load transfer system disclosed in the Konstant et al. '961 patent.

Therefore, it is a primary object and feature of the present invention to provide a dampening cylinder for a transfer mechanism that transfers a load between a first upper conveyor and a second lower conveyor.

It is a further object and feature of the present invention to provide a dampening cylinder for a transfer mechanism that controls the movement of the transfer mechanism between a first upper conveyor; a second lower conveyor; and an intermediate position wherein a load being transferred may be acted upon.

It is a still further object and feature of the present invention to provide a dampening cylinder for a transfer mechanism which transfers a load between an upper conveyor and a second lower conveyor which is simple and inexpensive to manufacture.

It is a still further object and feature of the present invention to provide a dampening cylinder for a transfer mechanism that incorporates an emergency stop to limit movement of the transfer mechanism.

In accordance with the present invention, a dampening cylinder is provided. The dampening cylinder includes a cylindrical housing having first and second ends and an inner surface defining a cavity in the housing for receiving a fluid therein. A piston slidably extends through the cavity in the housing. A flange projects from the piston and is positioned within the cavity so as to divide the cavity in the housing into first and second portions. The flange terminates at a radially outer edge that forms a slidable interface with the inner surface of the housing. A flow conduit has a first end communicating with the first portion of the cavity in the housing and a second end communicating with the second portion of the cavity in the housing. The flow conduit includes first and second flow control valves and an emergency stop valve. The first and second flow control valves control the flow of fluid between the first and second portions of the cavity in the housing. Each flow control valve includes a flow regulator having a plurality of user selectable discrete settings for controlling the flow rate and for providing a discrete metered fluid flow through a corresponding flow control valve. The emergency stop valve is movable between a first open position wherein fluid is allowed to flow between the first and second portions of the cavity in the housing and a closed position wherein the fluid is prevented from flowing between the first and second portions of the cavity of the housing.

The first flow control valve includes first and second orifices interconnected by first and second parallel flow paths. The flow regulator of the first flow control valve is movable between a first retracted position wherein the flow regulator of the first flow control valve is removed from the first flow path and a second extended position wherein the flow regulator of the first flow control valve extends into the first flow path. In addition, the first flow control valve includes a check valve disposed in the second flow path. The check valve allows for the flow of fluid through the second flow path in a first direction and prevents the flow of fluid through the second flow path in the second direction.

The second flow control valve also includes first and second orifices interconnected by first and second parallel flow paths. The first and second flow control valves are connected in series. The flow regulator of the second flow control valve is movable between a first retracted position wherein the flow regulator of the second flow control valve is removed from the first flow path of the second flow control valve and a second extended position wherein the flow regulator of the second flow control valve extends into the first flow path of the second flow control valve.

It is contemplated to operatively connect a handle to the emergency stop valve. The handle allows a user to move the emergency stop valve between the open and closed positions.

In accordance with a further aspect of the present invention, a dampening cylinder is provided. The dampening cylinder includes a cylindrical housing having first and second ends and an inner surface defining a cavity in the housing for receiving a fluid therein. A piston slidably extends through the cavity in the housing. A flange projects from the piston and is positioned within the cavity so as to divide the cavity in the housing into first and second portions. The flange terminates at a radially outer edge that forms a slidable interface with the inner surface of the housing. A first conduit has a first end communicating with the first portion of the cavity in the housing and a second end. A second conduit has a first end communicating with the second portion of the cavity in the housing and a second end. A control valve structure is disposed between the first and second conduits for controlling the flow of fluid between the first and second portions of the cavity in the housing. The control valve structure includes first and second flow control valves connected in series between the first and second conduits. An emergency stop valve is positioned in fluid communication with the fluid flow between the first and second portions of the cavity in the housing. The stop valve is movable between a first open position for allowing slidable movement of the piston within the housing and a closed position for preventing slidable movement of the piston in the housing.

The first flow control valve includes first and second orifices interconnected by first and second parallel flow paths. The first orifice communicates with the first portion of the cavity by means of the first conduit. The first flow control valve includes a flow regulator having a plurality of user selectable settings and is movable into the first flow path. The flow regulator provides a discrete metered fluid flow through the first flow path. The first flow control valve also includes a check valve disposed in the second flow path. The check valve allows for the flow of fluid through the second flow path in a first direction and prevents the flow of fluid through the second flow path in a second direction.

The second flow control valve includes a flow regulator having a plurality of user selectable settings and is movable into the first flow path of the second flow control valve. The flow regulator provides a discrete metered fluid flow through the first flow path. The second flow control valve includes a check valve disposed in the second flow path of the second flow control valve. The check valve of the second flow control valve allows for the flow of fluid through the second flow path of the second flow control valve in the second direction and prevents the flow of fluid through the second flow path of the second flow control valve in the first direction.

It is contemplated to operatively connect a handle to the emergency stop valve. The handle allows a user to move the emergency stop valve between the open and closed positions.

In accordance with a still further aspect of the present invention, a dampening cylinder is provided. The dampening cylinder includes a cylindrical housing having first and second ends and an inner surface defining a cavity in the housing for receiving a fluid therein. A piston slidably extends through the cavity in the housing. A flange projects from the piston and is positioned within the cavity so as to divide the cavity in the housing into first and second portions. The flange terminates at a radially outer edge that forms a slidable interface with the inner surface of the housing. A flow conduit has a first end communicating with the first portion of the cavity in the housing and a second end communicating with the second portion of the cavity in the housing. First and second flow control valves control the flow of fluid between the first and second portions of the cavity in the housing. Each flow control valve includes a flow regulator having a plurality of user selectable discrete settings for controlling the flow rate therethrough. An emergency stop valve is positioned in fluid communication with the fluid flowing between the first and second portions of the cavity in the housing. The stop valve is movable between a first open position for allowing the flow of fluid between the first and second portions of the cavity in the housing and a closed position for preventing the flow of fluid between the first and second portions of the cavity in the housing. A handle is operative connected to the emergency stop valve for allowing a user to move the emergency stop valve between the open and closed positions.

The first flow control valve includes first and second ends interconnected by first and second parallel flow paths. The first end communicates with the first portion of the cavity through the first conduit. The first flow control valve includes a flow regulator having a plurality of user selectable settings and is movable into the first flow path. The flow regulator provides a discrete metered fluid flow through the first flow path. The first flow control valve also includes a check valve disposed in the second flow path. The check valve allows for the flow of fluid through the second flow path in a first direction and prevents the flow of fluid through the second flow path in a second direction.

The second flow control valve includes a flow regulator having a plurality of user selectable settings and is movable into the first flow path of the second flow control valve. The flow regulator provides a discrete metered fluid flow through the first flow path. The second flow control valve includes a check valve disposed in the second flow path of the second flow control valve. The check valve of the second flow control valve allows for the flow of fluid through the second flow path of the second flow control valve in the second direction and prevents the flow of fluid through the second flow path of the second flow control valve in the first direction.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 7 is a cross-sectional view, similar to FIG. 6, showing the load retaining mechanism in a released position;

FIG. 8 is a cross-sectional view taken along line 8—8 of FIG. 6;

FIG. 9 is a cross-sectional view taken along line 9—9 of FIG. 5;

DETAILED DESCRIPTION OF THE DRAWINGS

Figure 1:
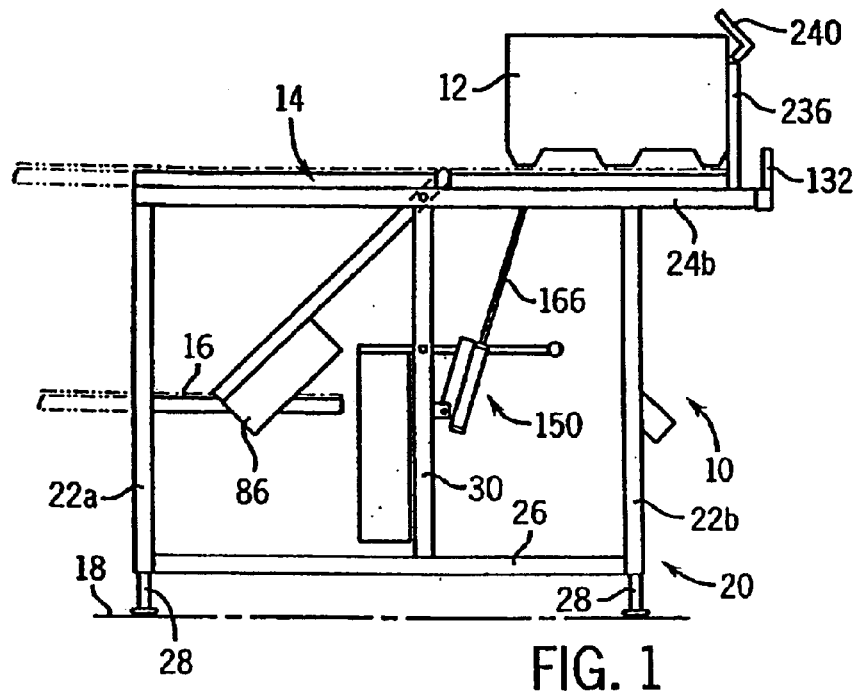
FIG. 1 is a side elevational view of a transfer mechanism in accordance with the present invention showing the transfer mechanism in a first loading position.

Referring to FIGS. 1–4, a transfer mechanism in accordance with the present invention is generally designed by the reference numeral 10. Transfer mechanism 10 is intended to transfer a load such as container 12 between an upper conveyor generally designated by the reference numeral 14, and a lower conveyor, generally designated by the reference numeral 16.

Transfer mechanism 10, upper conveyor 14, lower conveyor 16 are supported above a supporting surface 18 by a supporting frame 20. Support frame 20 includes pairs of end columns 22a and 22b interconnected by upper spaced beams 24a (FIG. 5) and 24b, and by lower spaced beams 26. Each of the end columns 22a and 22b include adjustable feet 28 which are telescopically received within the lower ends of end columns 22a and 22b so as to allow support frame 20 to be leveled with respect to supporting surface 18. Support frame 20 further includes a pair of intermediate columns 30 having upper ends interconnected to corresponding upper beams 24a and 24b and lower ends interconnected to corresponding lower beams 26.

Figure 5:
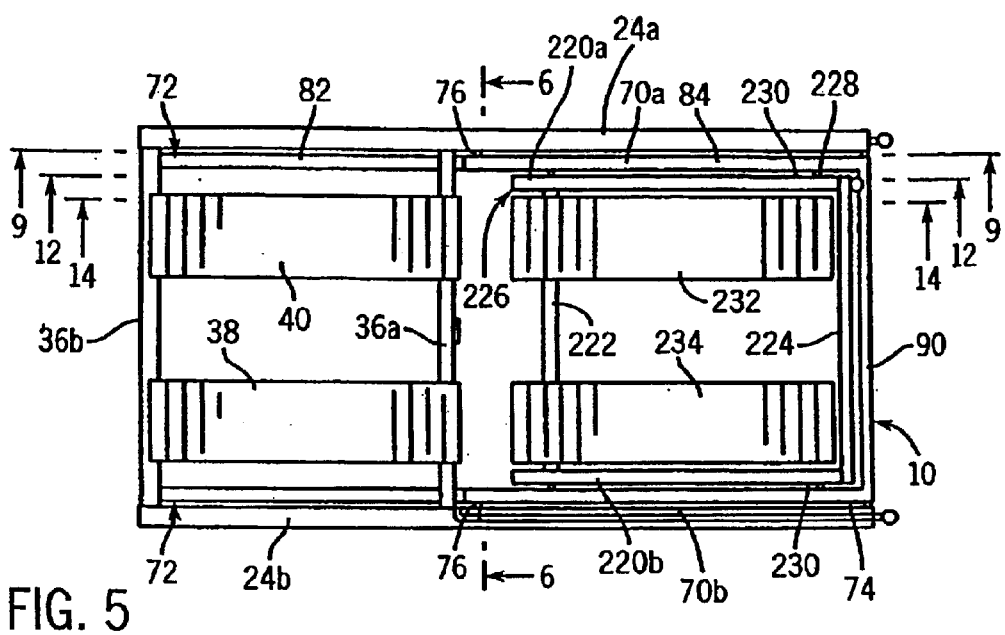
FIG. 5 is a top plan view of the transfer mechanism of the present invention taken along line 5—5 of FIG. 4.
Figure 6:
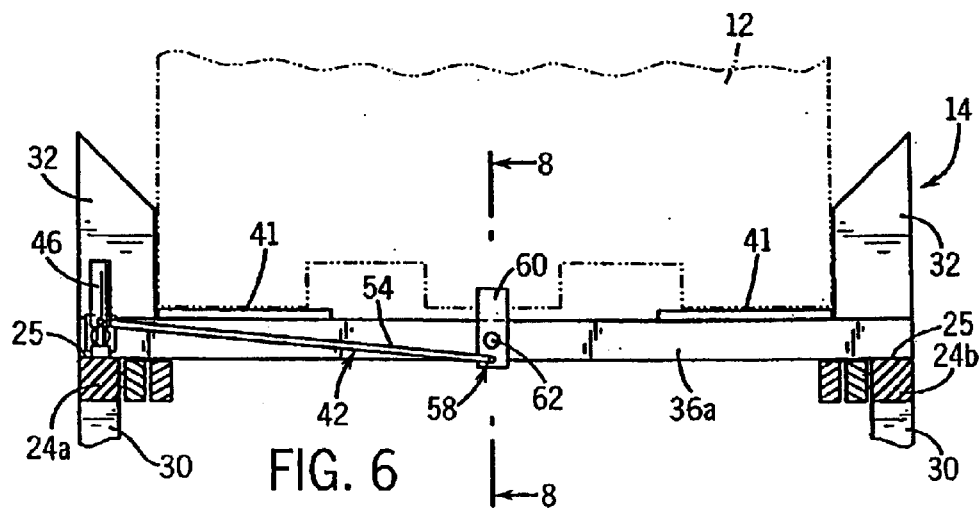
FIG. 6 is a cross-sectional view of the transfer mechanism of the present invention taken along line 6—6 of FIG. 5 showing a load retaining mechanism in a first load retaining position.

Referring to FIG. 6, upper conveyor 14 includes first and second generally parallel guide members 32 mounted on corresponding upper surfaces 25 of upper beams 24a and 24b. As best seen in FIG. 5, upper beams 24a and 24b are interconnected by spaced, forward and rearward cross beams 36a and 36b, respectively, which, in turn, support first and second roller sets 38 and 40, respectively, of parallelly extending rollers 41 (FIG. 8).

Referring to FIGS. 6–8, load retaining mechanism 42 is provided for maintaining load 12 on upper conveyor 14 and selectively preventing container 12 from axially sliding from roller sets 38 and 40 onto transfer mechanism 10. Load restraining mechanism 42 includes a first rod 44 extending along the upper surface 24a of one of the pair of upper beams 24a and 24b. Rod 44 includes a handle 46 mounted to a first end 48 thereof and a plate 50 rigidly mounted to an opposite second end 52 thereof. Load retaining mechanism 42 further includes a second rod 54 having a first end 56 interconnected to plate 50 and a second end rigidly connected to load restraining plate 60. Load restraining plate 60 is pivotably mounted to forward cross beam 36a by a pivot pin 62. With handle 46 in a first position, FIG. 6, load restraining plate 60 extends vertically from forward cross beam 36a so as to prevent container 12 from sliding axially (from right to left in FIG. 8) along roller sets 38 and 40 of rollers 41 onto transfer mechanism 10. By rotating handle 46 counterclockwise in FIGS. 6–7, plate 50 is rotated by rod 44 such that second rod 54 is drawn from right to left in FIGS. 6–7. As a result, load restraining plate 60 pivots on pivot pin 62 such that load restraining plate 60 is generally parallel to forward cross beam 36a and is out of interfering relationship with container 12, FIG. 7, thereby allowing container 12 to be slid axially along roller sets 38 and 40 of rollers 41 onto transfer mechanism 10.

Referring to FIGS. 1–4 and 14, lower conveyor 16 includes a pair of spaced lower conveyor rails 66 which extend from corresponding end columns 22a such that lower conveyor 16 is disposed below upper conveyor 14. Lower conveyor rails 66 support first and second roller sets 67 of rollers 41, for reasons hereinafter described.

As best seen in FIG. 5, transfer mechanism 10 includes a pair of spaced rails 70a and 70b having first and second opposite ends 72 and 74, respectively. Rails 70a and 70b are pivotably connected to corresponding upper beams 24a and 24b, respectively, by pivot pins 76. Rails 70a and 70b pivot between a first position, FIGS. 1 and 4, wherein the rails 70a and 70b are generally co-planar with upper conveyor 14 and a second position, FIGS. 2–3, wherein rails 70a and 70b are at a predetermined angle to upper conveyor 14. It is contemplated that in the second position, FIGS. 2–3, rails 70a and 70b be at an angle, e.g. 45 degrees, with respect to supporting surface 18 so as to allow container 12 to be in an ergometrically friendly position, as hereinafter described. Rails 70a and 70b are retained in the first position by pin structures 80 (FIG. 10), as hereinafter described.

Rails 70a and 70b have first portions 82 adjacent the first ends 72 thereof and second portions 84 adjacent second ends 74 thereof. First and second portions 82 and 84 are at predetermined angles with respect to each other. Counterweights 86 are mounted to first portions 82 of rails 70a and 70b so as to urge rails 70a and 70b towards the first position, FIGS. 1 and 4.

Figure 10:
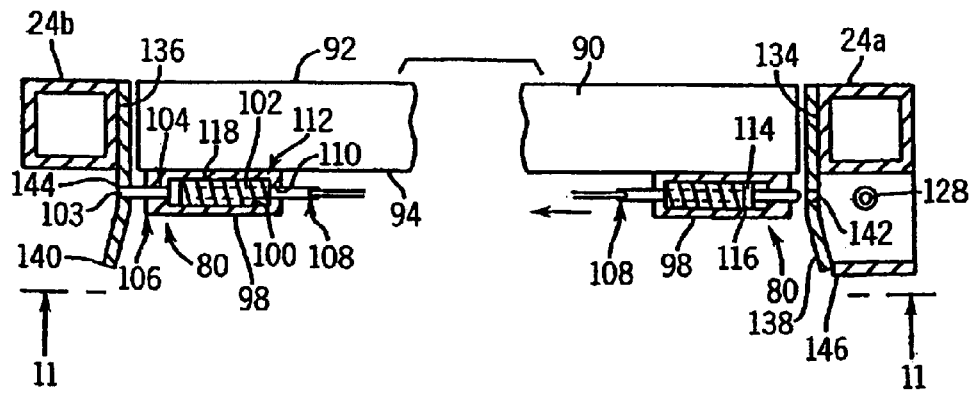
FIG. 10 is a cross-sectional view taken along line 10—10 of FIG. 9.
Figure 11:
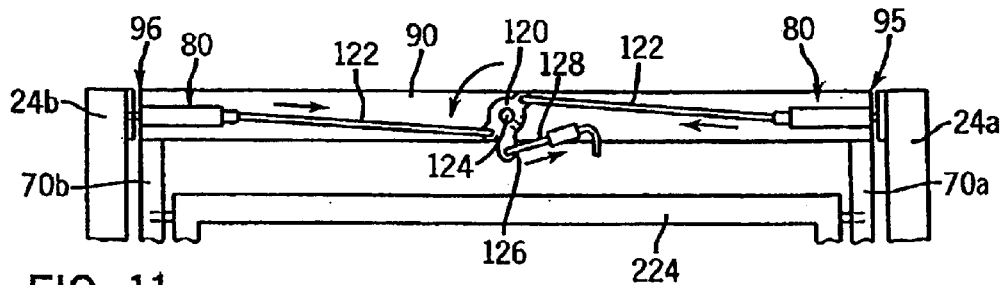
FIG. 11 is a cross-sectional view taken along line 11—11 of FIG. 10.

Referring to FIGS. 10–11, first ends 74 of rails 70a and 70b are interconnected by cross beam 90. Cross beam 90 includes an upper surface 92 and a lower surface 94. Pin structures 80 are mounted onto lower surface 94 at opposite ends 95 and 96 of cross beam 90 adjacent corresponding ends 74 of rails 70a and 70b, respectively. Each pin structure 80 includes a pin housing 98 having an inner surface 100 defining a generally cylindrical chamber therein. A pin member 102 is slidably received within the chamber in pin housing 98. Pin member 102 includes a first end 103 which projects through a corresponding opening 104 in a first end 106 of pin housing 98 and a second opposite end 108 which projects through an opening 110 in a second opposite end 112 of pin housing 98. A flange 114 projects radially from pin member 102 and includes a radially outer surface 116 which engages the inner surface 100 of pin housing 98 and forms a slidable interface therewith. A spring 118 is disposed within the chamber within pin housing 98 so as to engage flange 114 and urge flange 114 away from second end 112 of pin housing 98.

Second ends 108 of pin members 102 of pin structures 80 are interconnected to connection bracket 120 by cables 122.

Connection bracket 120 is pivotably mounted to the lower surface 94 of cross beam 90 by a pivot pin 124. Connection bracket 120 is further connected to a first end 126 of a push/pull cable 128. Second end 130 of push/pull cable 128 is interconnected to a handle 132 (FIG. 12).

Upper beams 24a and 24b include corresponding inwardly directed surfaces 134 and 136, respectively. Mounting brackets 138 and 140 are affixed to corresponding inner surfaces 134 and 136, respectively, of upper beams 24a and 24b, respectively. Mounting brackets 138 and 140 include corresponding openings 142 and 144, respectively, which are axially aligned with pin members 102 of corresponding pin structures 80. Mounting bracket 138 includes a generally horizontal handle supporting portion 146 interconnected thereto. Handle 132 is pivotably mounted to handle support portion 146 such that handle 132 is movable between a first non-release position, FIG. 9, and a second release position, shown in phantom in FIG. 9. As described, with the handle in the first position, second ends 108 of pin members 102 of pin structures 80 fully extend from the second end 110 of pin housing 98. By pivoting handle 132 to the release position, push/pull cable 128 rotates connection bracket 120 on pivot pin 124 so as to retract pin members 102 within pin housings 98 through cables 122 and to allow rails 70a and 70b to pivot on pivot pins 76.

Figure 12:
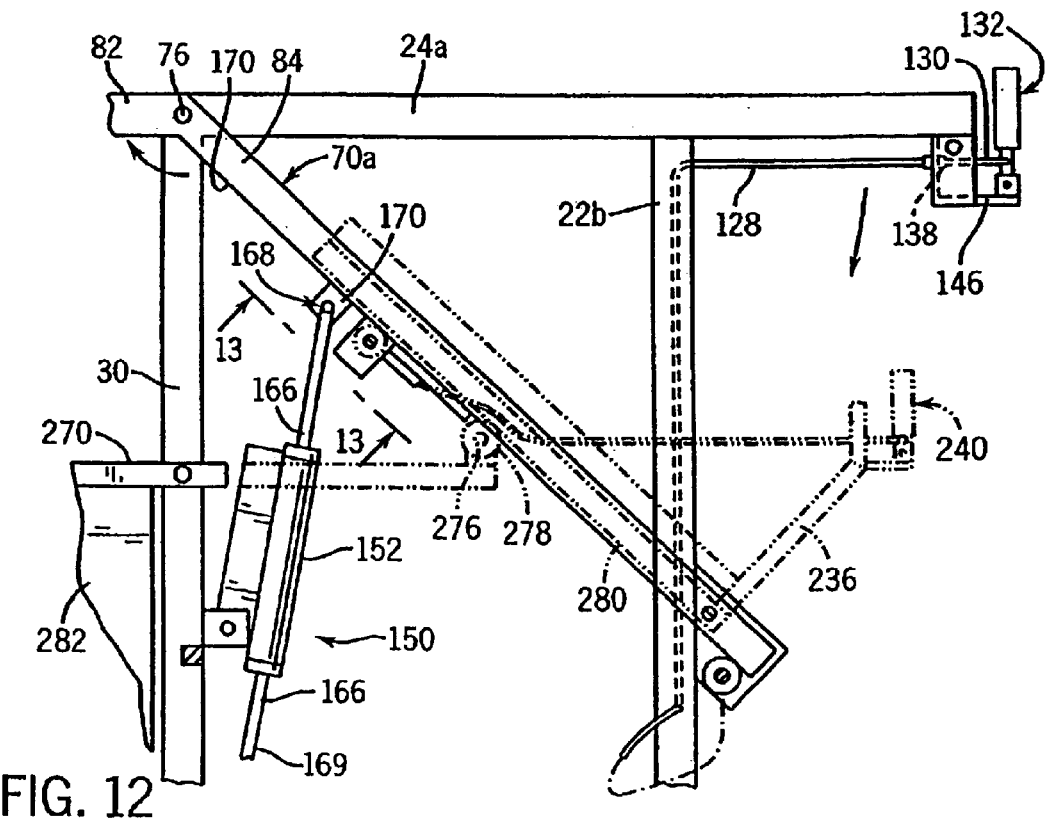
FIG. 12 is a cross-sectional view taken along line 12—12 of FIG. 5.
Figure 15:
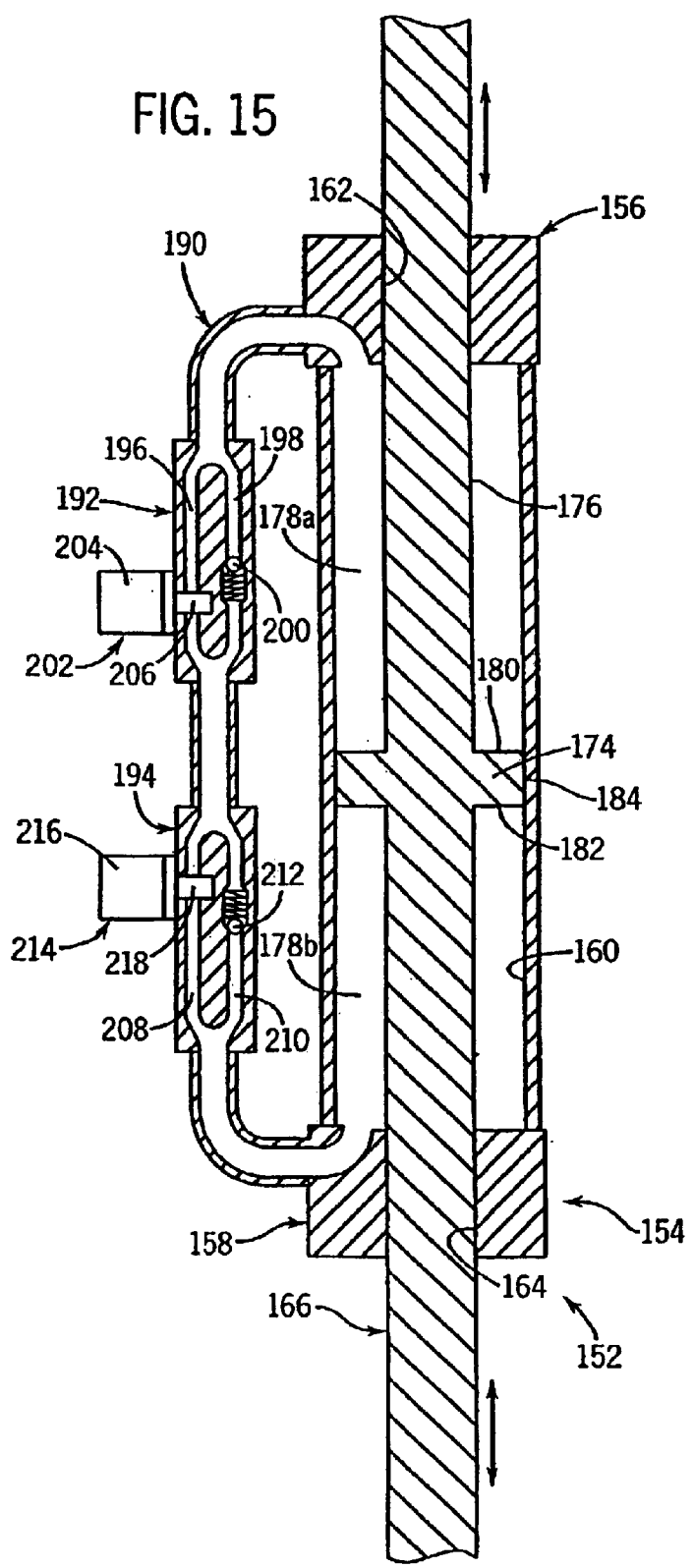
FIG. 15 is a cross-sectional view of a dampening mechanism of the transfer mechanism of the present invention.

As best seen in FIG. 12, rail 70b is interconnected to one of the intermediate columns 30 by a cylinder assembly generally designated by the reference numeral 150. Cylinder assembly 150 includes a dampening cylinder 152 pivotably mounted to one of the intermediate columns 30. Dampening cylinder 152 includes cylinder housing 154 having first and second opposite ends 156 and 158, respectively. Referring to FIG. 15, cylinder housing 154 includes an inner surface 160 defining a chamber therein. Ends 156 and 158 of cylinder housing 154 includes corresponding openings 162 and 164 therein which are axially aligned with each other. A piston rod 166 extends through openings 162 and 164 in cylinder housing 154. Piston rod 166 includes a first end 168 pivotably mounted to a mounting flange 170 depending from the underside 172 of rail 70b and a second opposite end 169.

Piston rod 166 further includes a flange 174 projecting radially from the outer surface 176 thereof and disposed within the chamber of cylinder housing 154. Flange 174 divides the chamber within cylinder housing 154 into a first portion 178a and a second portion 178b. Flange 174 is defined by a first surface 180 which is directed towards first portion 178a of the chamber within cylinder housing 154 and a second surface 182 directed towards the second portion 178b of the chamber within cylinder housing 154. First and second surfaces 180 and 182, respectively, of flange 174 are interconnected by a radially outer end surface 184 which forms a slidable interface with the inner surface 160 of cylinder housing 154.

First and second portions 178a and 178b, respectively, of the chamber within cylinder housing 154 are interconnected by a conduit 190. Conduit 190 includes first and second flow control valves 192 and 194, respectively, which control the flow of fluid between first and second portions 178a and 178b, respectively, of the chamber within cylinder housing 154. Flow control valve 192 includes first and second parallel passages 196 and 198, respectively, therethrough. Check valve 200 is disposed in second passage 198 so as to allow fluid exiting first portion 178a of the chamber in cylinder housing 154 to flow therethrough and to prevent fluid exiting second portion 178b of chamber in cylinder housing 154 to flow therepast. Flow control valve 192 further includes a flow regulator 202. Flow regulator 202 includes an enlarged end 204 having a shaft 206 projecting therefrom. Shaft 206 extends into passage 196 such that by rotating enlarged head 204 of flow regulator 202, shaft 206 moves into and out of interfering relationship with passage 196 so as to control the flow of fluid therepast.

Similarly, flow control valve 194 includes first and second parallel passages 208 and 210, respectively, therethrough. Check valve 212 is disposed in second passage 210 so as to allow fluid exiting second portion 178b of the chamber in cylinder housing 154 to flow therethrough and to prevent fluid exiting first portion 178a of the chamber in cylinder housing 154 to flow therepast. Flow control valve 194 further includes a flow regulator 214. Flow regulator 214 includes an enlarged head 216 having a shaft 218 projecting therefrom. Shaft 218 extends into passage 208 such that by rotating enlarged head 216 of flow regulator 214, shaft 218 moves into and out of interfering relationship with passage 208 so as to control the flow of fluid therepast.

Figure 2:
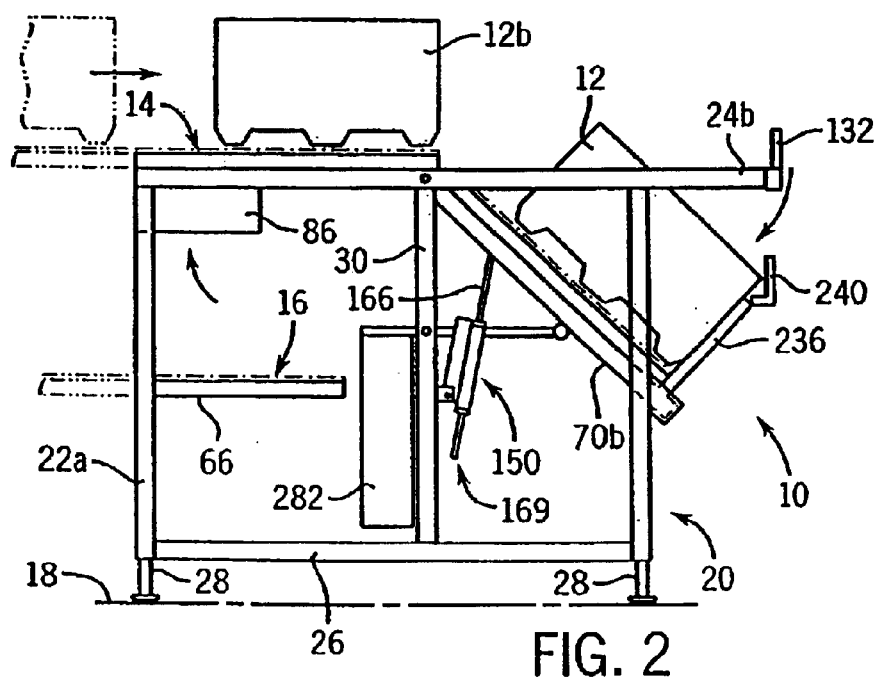
FIG. 2 is a side elevational view of the transfer mechanism of the present invention showing the transfer mechanism in an intermediate loading position.
Figure 3:
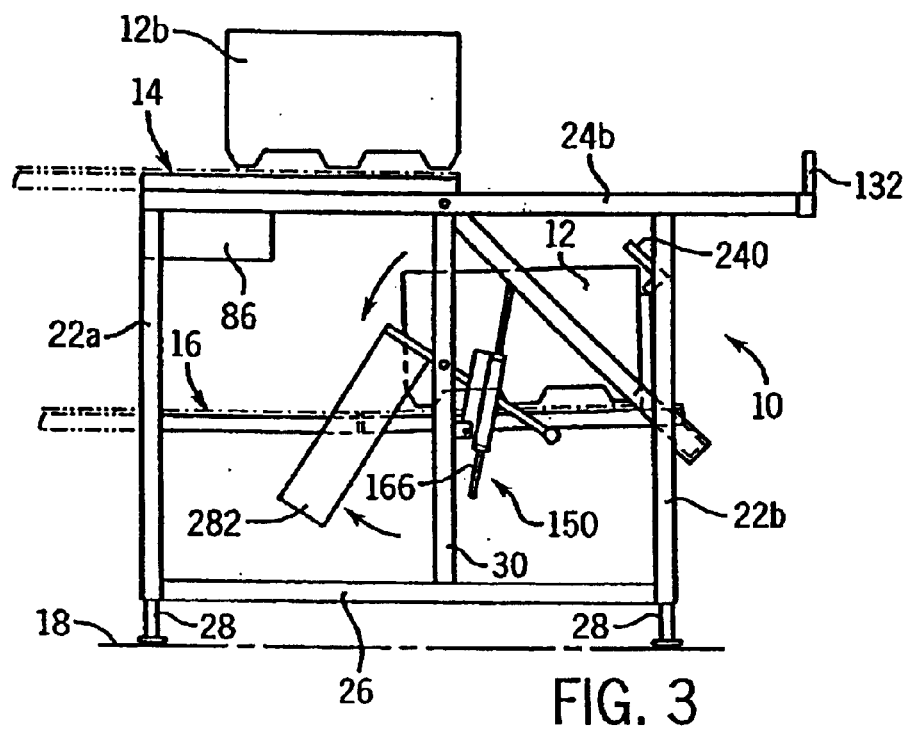
FIG. 3 is a side elevational view showing the transfer mechanism of the present 30 invention showing the transfer mechanism in a third, transferred position
Figure 4:
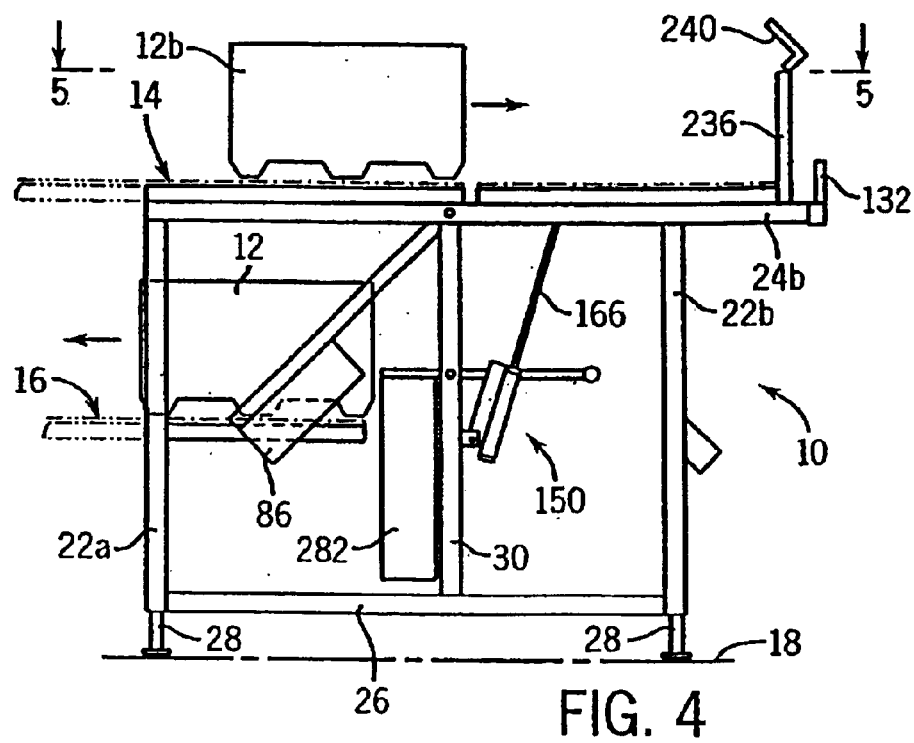
FIG. 4 is a side elevational view, similar to FIG. 1, showing the transfer mechanism of the present invention in the first, loading position.

As rails 70a and 70b pivot from the first position, FIGS. 1 and 4, to the second position, FIGS. 2–3, piston rod 166 slides axially (downwardly in FIG. 15) through cylinder housing 154. As piston rod 166 is urged downwardly in FIG. 15, fluid within second portion 178b of the chamber in cylinder housing 154 is urged therefrom by flange 174. The fluid exiting second portion 178b of the chamber in cylinder housing 154 flows through flow control valve 194 past shaft 218 of flow regulator 214 in first passage 208 and past check valve 212 disposed in second passage 210. The flow of fluid through first passage 208 is limited by the portion of shaft 218 in interfering relationship with passage 208.

As the fluid is urged towards flow control valve 192 by flange 174 of piston rod 166, the fluid enters first and second passages 196 and 198, respectively, of flow container valve 192. Check valve 200 disposed in second passage 198 prevents fluid from flowing therepast. As a result, all of the fluid must flow through first passage 196 through flow control valve 192. As such, the portion of shaft 206 within first passage 196 controls the flow of fluid through flow control valve 192. A user may rotate enlarged head 204 of flow regulator 202 in order to control the rate of fluid flowing through flow control valve 192. The flow rate of the fluid through flow control valve controls the rate of movement of the piston rod 166 through cylinder housing 154 that, in turn, controls the rate at which the rails 70a and 70b move between the first position, FIGS. 1 and 4, and the second position, FIGS. 2–3.

Alternatively, as rails 70a and 70b pivot from the second position, FIGS. 2–3, to the first position, FIGS. 1 and 4, piston rod 166 slides axially (upwardly in FIG. 15) through cylinder housing 154 in an opposite direction. As piston rod 166 is urged upwardly in FIG. 15 by counterweight 86, fluid within the first portion 178a of the chamber in cylinder housing 154 is urged therefrom by flange 174. The fluid exiting first portion 178a of the chamber in cylinder housing 154 flows through flow control valve 192 past shaft 206 of flow regulator 202 in first passage 196 and past check valve 200 disposed in second passage 198. The flow of fluid through first passage 196 is limited by the portion of shaft 206 in interfering relationship with passage 196.

As the fluid is urged towards flow control valve 194 by flange 174 of piston rod 166, the fluid enters first and second passages 208 and 210, respectively, of flow control valve 194. Check valve 212 disposed in second passage 210 prevents fluid from flowing therepast. As a result, all of the fluid must flow through first passage 208 through flow control valve 194. As such, the portion of shaft 218 within first passage 208 controls the flow of fluid through control valve 194. A user may rotate enlarged head 216 of flow regulator 214 in order to vary the portion of shaft 218 in passage 208 of flow control valve 194 so as to control the rate of fluid flowing therethrough. The flow rate of the fluid through flow control valve 194 controls the rate of movement of piston rod 166 through cylinder housing 154 which, in turn, controls the rate at which the rails 70a and 70b move between the second position, FIGS. 2–3, and the first position, FIGS. 1 and 4. It can be appreciated that flow control valves 192 and 194 may be used to optimize the rate at which rails 70a and 70b move between the first and second positions.

Referring back to FIG. 5, transfer mechanism 10 further includes inner rails 220a and 220b, respectively, interconnected by cross beams 222 and 224. Cross beams 222 and 224 support first and second roller sets 232 and 234, respectively, of parallelly extending rollers 41. Inner rails 220a and 220b have first and second opposite ends 226 and 228, respectively, and are pivotably mounted adjacent second ends 228 thereof to corresponding rails 70aand 70b, respectively, by pivot pins 230. Inner rails 220a and 220b are pivotable on corresponding pivot pins 230 between a first position, FIGS. 1–2 and 4 wherein inner rails 220a and 220b are generally co-planar with rails 70a and 70b and a second position, FIG. 3, wherein inner rails 220a and 220b are at a predetermined angle to rails 70a and 70b. Inner rails 220a and 220b are retained in the first position by pin structures 80 as hereinafter described.

Figure 14:
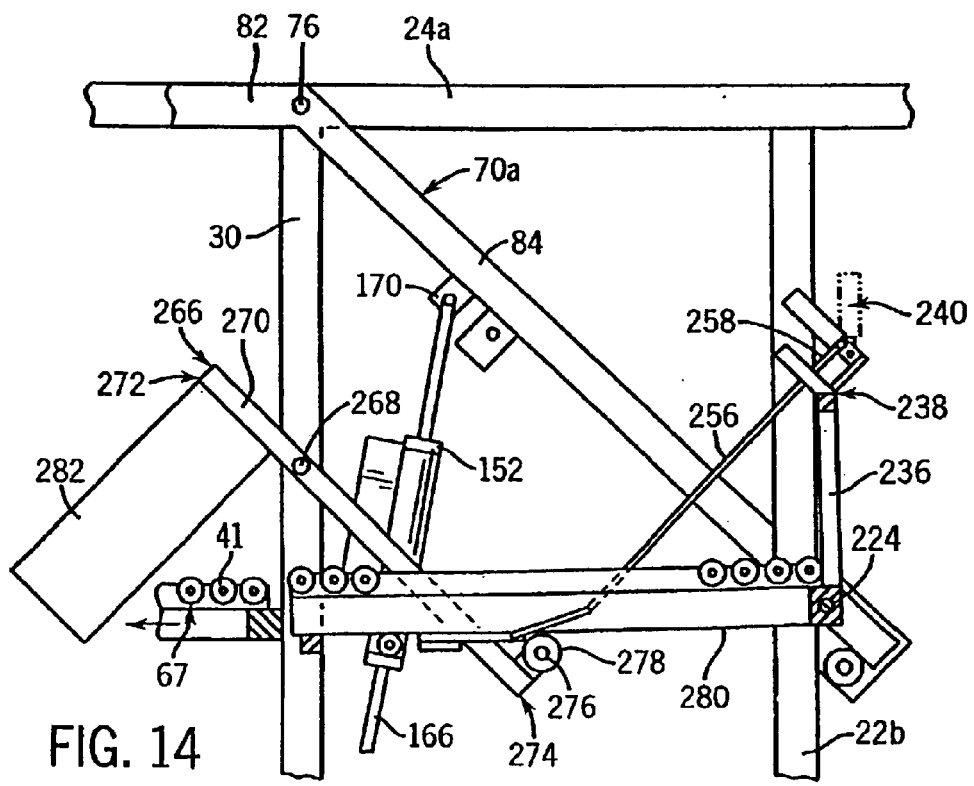
FIG. 14 is a cross-sectional view taken along line 14—14 of FIG. 5.

As best seen in FIG. 14, cross beam 224 includes a stop member 236 projecting therefrom perpendicular to inner rails 220a and 220b. As best seen in FIGS. 1–2, stop member 236 is intended to retain container 12 on transfer mechanism 10 as rails 70a and 70b are pivoted between the first and second positions. Stop member 236 includes a terminal end 238 having a handle 240 mounted thereto, for reasons hereinafter described.

Figure 13:
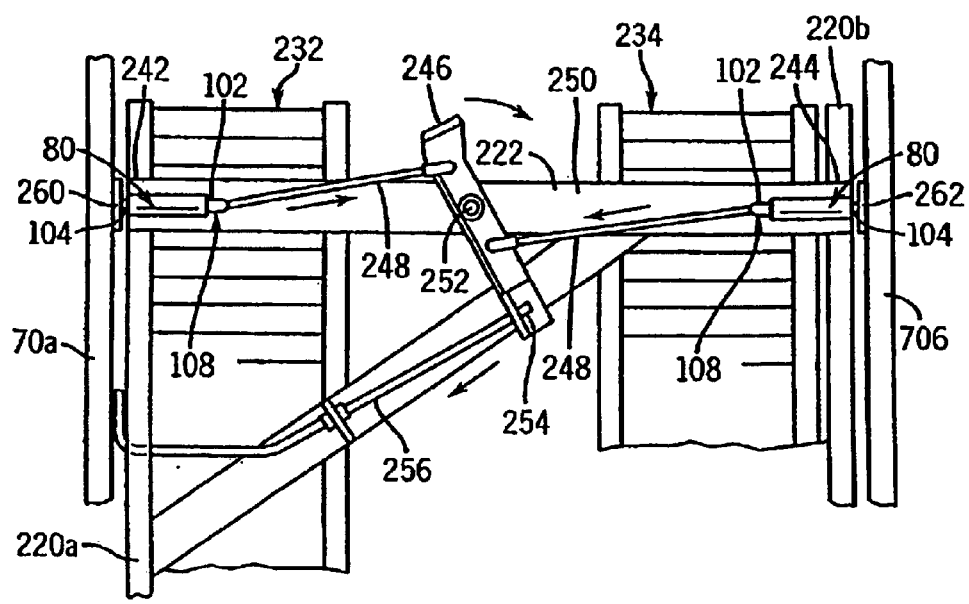
FIG. 13 is a cross-sectional view taken along line 13—13 of FIG. 12.

Referring to FIGS. 13–14, pin structures 80 are mounted on opposite ends 242 and 244 of lower surface 250 of cross beam 222 adjacent corresponding ends 226 of rails 220a and 220b, respectively. Second ends 108 of pin members 102 of pin structures 80 are interconnected to connection bracket 246 by cables 248. Connection bracket 246 is pivotably mounted to the lower surface 250 of cross beam 222 by a pivot pin 252. Connection bracket 246 is further connected to a first end 254 of a push-pull cable 256. Second end 258 of push-pull cable 256 is interconnected to handle 240, FIG. 14.

Rails 70a and 70b include corresponding reinforced openings 260 and 262, respectively, which are axially aligned with pin members 102 of corresponding pin structures 80 mounted to lower surface 250 of cross beam 222. Handle 240 is movable between a first non-release position and a second release position, shown in phantom in FIG. 14. With handle 240 in the non-release position, second ends 108 of pin members 102 of pin structures 80 extend from second end 112 of pin housing 98 so as to allow second ends 108 of pin members 102 to be received within corresponding reinforced openings 260 and 262 in rails 70a and 70b, respectively. By pivoting handle 240 to the release position, push-pull cable 256 rotates connection bracket 246 on pivot pin 252 so as to retract pin members 102 within pin housing 98 through cables 248 thereby allowing inner rails 220a and 220b to pivot on corresponding pivot pins 230.

Counterweight structures 266 are pivotably mounted to corresponding intermediate columns 30 by pivot pins 268.

Each counterweight structure 266 includes a support shaft 270 having first and second opposite ends 272 and 274, respectively. Rollers 276 are rotatably mounted on second ends 274 of support shafts 270. Rollers 276 include outer peripheral surfaces 278 that engage the underside 280 of corresponding inner rails 220a and 220b, respectively. Counterweights 282 are mounted to second ends 272 of support rod 270. Counterweights 282 urge support shafts 270 to pivot counterclockwise on pivot pins 268. As such, rollers 276 roll along the underside 280 of corresponding inner rails 220a and 220b so as to urge inner rails 220a and 220b toward the first position.

In operation, a container 12 is deposited on upper conveyor 14. Handle 46 of load retaining mechanism 42 is pivoted from the first position, FIG. 6, to the second position, FIG. 7, such that load restraining plate 60 is out of interfering relationship with container 12. Container 12 is slid from roller sets 38 and 40 onto roller sets 232 and 234 of transfer mechanism 10. Handle 46 is returned to the first position, FIG. 6, wherein load restraining plate 60 extends vertically from forward cross beam 36a so as to prevent container 12 from sliding axially back onto to roller sets 38 and 40. A second container 12b, FIG. 2, is positioned on upper conveyor 14 and maintained thereon by load restraining plate 60. Handle 132 is moved from the non-release to the release position so as to allow rails 70a and 70b to pivot towards the second position. The weight of container 12 urges rails 70a and 70b from the first to the second position against the bias of counterweights 86. As heretofore described, the rate at which rails 70a and 70b pivot between the first position, FIGS. 1 and 4, and the second position, FIGS. 2–3, is controlled by cylinder assembly 150, as heretofore described.

With rails 70a and 70b in the second position, container 12 is in an ergometrically friendly position whereby an individual may load or unload product into container 12, FIG. 2. Upon completion of such task, handle 240 is moved between the first non-release position to the release position so as to allow inner rails 220a and 220b to pivot to the second position, FIG. 3. Container 12 is slid from roller sets 232 and 234 onto roller sets 67 on lower conveyor 66. Container 12 is thereafter transported by conveyor or other suitable means to a different locale within a factory.

With container 12 deposited on lower conveyor 16, counterweights 282 urge inner rails 220a and 220b toward the first position as heretofore described. With inner rails 220a and 220b in the first position, handle 240 is returned to the non-release position such that pin structures 80 mounted to lower surface 250 of cross beam 222 interconnect inner rails 220a and 220b to corresponding rails 70a and 70b, respectively. Thereafter, counterweight 86 urges rails 70a and 70b toward the first position, FIG. 4. The rate at which rails 70a and 70b move from the second position, FIG. 3, to the first position, FIG. 4, is controlled by cylinder assembly 150, as heretofore described. With rails 70a and 70b in the first position, FIG. 4, handle 132 is returned to the non-release position, FIG. 9, such that pin structures 80 mounted to cross beam 90 interconnect rails 70a and 70b to corresponding upper beams 24a and 24b, respectively, as heretofore described. The operation heretofore described may be repeated utilizing second container 12b.

Figure 16:
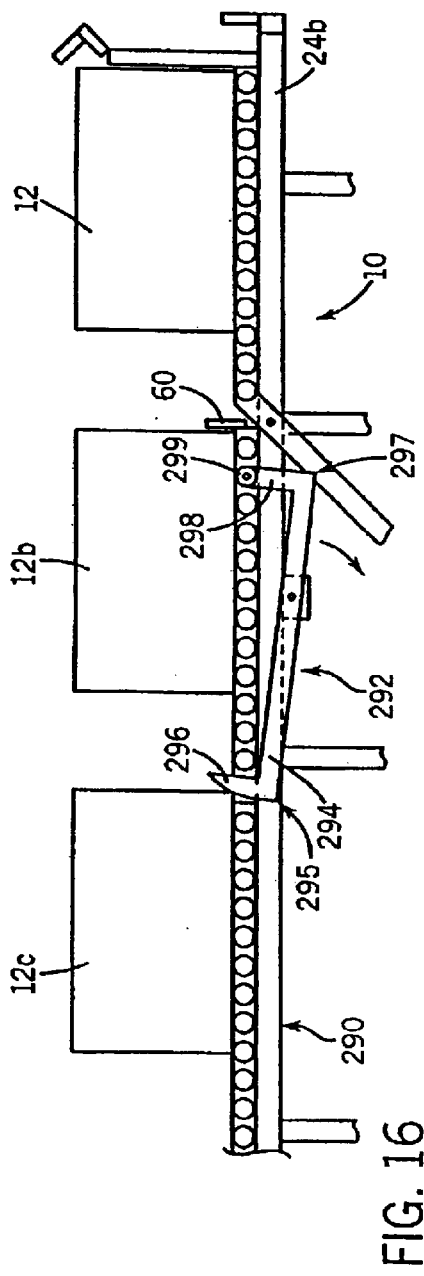
FIG. 16 is a side elevational view of an upper conveyor for use with the transfer mechanism of the present invention.
Figure 17:
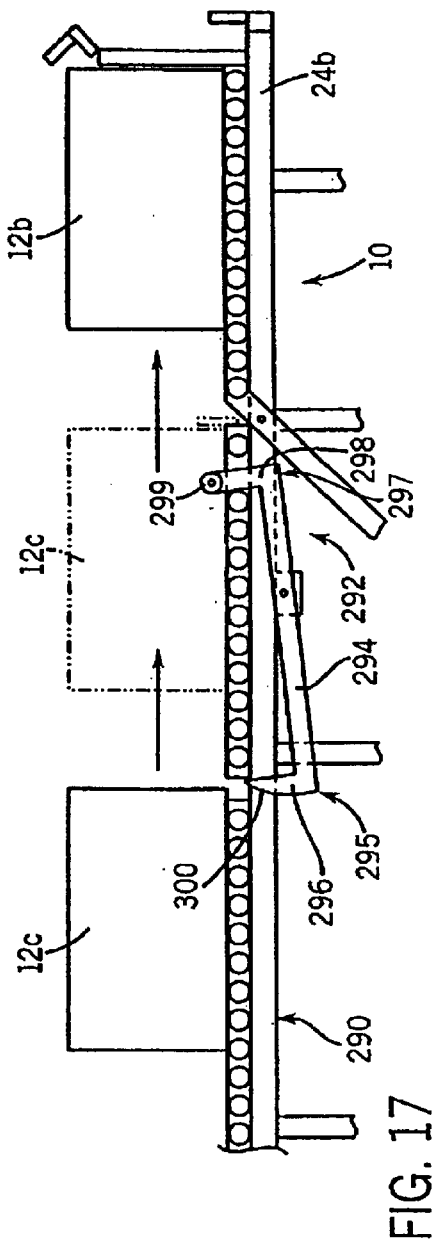
FIG. 17 is a side elevational view, similar to FIG. 16, showing an upper conveyor for use with the transfer mechanism of the present invention.

Referring to FIGS. 16 and 17, an alternate upper conveyor is generally designed by the reference numeral 290. It is contemplated that upper conveyor 290 may be used in connection with transfer mechanism 10 of the present invention. Upper conveyor 290 includes a flip-flop assembly designated by the reference numeral 292 for controlling the flow of containers 12, 12b and 12c from upper conveyor 290 to transfer mechanism 10. Flip-flop assembly 292 includes support 294 which is pivotably mounted to upper beam 24b. Support 294 includes a first end 295 having a stop 296 projecting therefrom and a second, opposite end 297 having a vertical arm 298 projecting therefrom. A roller 299 is mounted on the terminal end of vertical leg 298 of flip-flop assembly 292.

Flip-flop assembly 292 is pivotable between a first position, FIG. 17, wherein vertical arm 298 of flip-flop assembly 292 projects through rollers 41 of upper conveyor 290 into the path of containers 12, 12b and 12c, and a second position wherein stop member 296 projects through rollers 41 of upper conveyor 290 into the path of containers 12, 12b and 12c. It is contemplated to pivotably connect support 294 of flip-flop assembly 292 to upper beam 24b at a location closer to second end 297 of support 294 such that flip-flop assembly 292 is urged towards the first position, FIG. 17.

In operation, with container 12 positioned on transfer mechanism 10, conveyors 12b and 12c are positioned on upper conveyor 290. Container 12b rests on roller 299 of vertical leg 298 of flip-flop assembly 292 and is maintained in such position by load restraining plate 60 of load retaining mechanism 42. Stop member 296 on first end 295 of support 294 projects through upper conveyor 290 such that container 12c is maintained in an axially spaced relationship from container 12b.

After container 12 is deposited on lower conveyor 16 and transfer mechanism 10 is returned to its original position, FIG. 4, as heretofore described, handle 46 is moved from the first position, FIG. 6, to the second position, FIG. 7, so as to allow container 12b to be slid axially onto transfer mechanism 10. With container 12b on transfer mechanism 10, flip-flop assembly 292 pivots from the second position, FIG. 16, to the first position, FIG. 17, such that stop member 296 on first end 295 of support 294 moves out of interfering relationship with container 12c. It is contemplated that stop member 296 include a generally arcuate end surface 300 directed towards container 12c so as to facilitate the pivoting of flip-flop assembly 292 from the second position, FIG. 16, to the first position, FIG. 17.

Handle 46 is returned to the first position such that load restraining plate 60 projects vertically from forward cross beam 36a. In addition, with stop member 296 out of interfering relationship with container 12c, container 12c slides axially (from left to right in FIG. 17) towards engagement with load restraining plate 60 of load retaining mechanism 42. As container 12c engages roller 299 at the terminal end of vertical leg 298 of flip-flop assembly 292, container 12c urges flip-flop assembly 292 to the second position, FIG. 16, such that stop member 296 is in interfering relationship with the next, subsequent container on upper conveyor 290. In such a manner, flip-flop assembly 292 provides spacing between consecutive containers 12.

Figure 18:
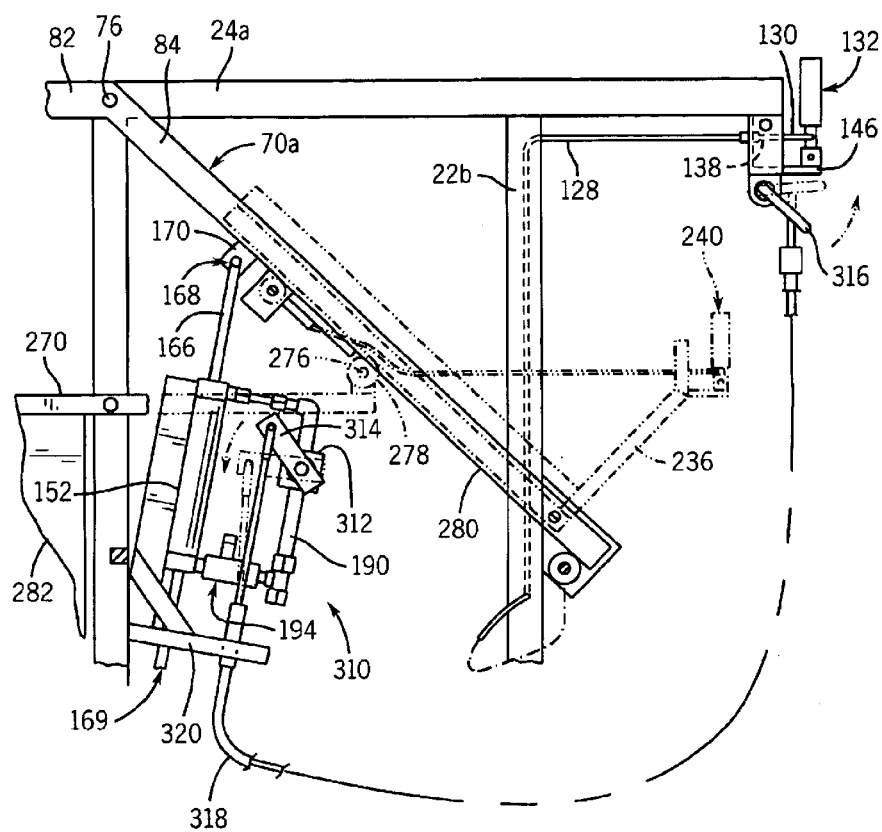
FIG. 18 is a cross-sectional view, similar to FIG. 12, showing the dampening mechanism incorporating an emergency stop valve.

Referring to FIG. 18, an alternate cylinder assembly is generally designated 310 by the reference numeral. Cylinder assembly 310 is identical in structure to cylinder assembly 150 except as hereinafter described. As such, the prior description of cylinder assembly 150 will be understood to describe cylinder assembly 310 as if fully described herein. Cylinder assembly 310 includes an emergency stop valve 312 disposed in conduit 19. In the depicted embodiment, stop valve 312 is disposed in conduit 190 between first and second flow control valves 192 and 194, respectively. Alternatively, stop valve 312 may be disposed in conduit 190 between first control valve 192 and first portion 178a of the chamber within cylinder housing 154 or in conduit 190 between second flow control valve 194 and second portion 178b of the chamber within cylinder housing 154, without deviating from the scope of the present invention.

Stop valve 312 is movable between a first open position allowing fluid to flow therethrough and a second closed position preventing fluid from flowing therethrough. It can be appreciated that with stop valve 312 in the open position, dampening cylinder 152 operates as heretofore described. However, with stop valve 312 in the closed position, fluid is unable to flow between first and second portions 178a and 178b, respectively, of the chamber within cylinder housing 154. With fluid unable to flow between first and second portions 178a and 178b, respectively, of the chamber within cylinder housing 154, piston rod 166 is unable to slide axially through cylinder housing 154. More specifically, with stop valve 312 in the closed position, the fluid second portion 178b of the chamber in cylinder housing 154 prevents piston rod 166 from sliding downwardly in FIG. 18 through cylinder housing 154 in response to a downward force on rails 70a and 70b. Similarly, with stop valve 312 in the closed position, fluid within first portion 178a of the chamber in cylinder housing 154 prevents piston rod 166 from sliding upwardly in FIG. 18 under the urging of counterweight 86. In other words, with stop valve 312 in the closed position, the positions of rails 70a and 70b are maintained.

It is contemplated for stop valve 312 to include stop valve handle 314 for moving stop valve 312 between the opened and closed positions. Valve handle 314 is operatively connected to a pivotable stop valve control handle 316 by push-pull cable 318. Stop valve control handle 316 is pivotable between the first non-actuated position wherein push-pull cable 318 urges stop valve handle 314 to the closed position and a second actuated position (shown in phantom in FIG. 18) wherein push-pull cable 318 urges stop valve handle 314 to the open position. It is contemplated to bias stop valve control handle 316 towards the non-actuated position and to support push-pull cable 318 with a connection bracket 320 mounted to one of intermediate columns 30.

As heretofore described, in operation, container 12 is deposited upon transfer mechanism 10 between rails 70a and 70b. Handle 132 is moved from the non-release to the release position so as to free rails 70a and 70b. However, with stop valve control handle 316 in a non-actuated positions, the position of rails 70a and 70b are maintained since fluid in dampening cylinder 152 is unable to flow between first portion 178a and second portion 178b of the chamber within cylinder housing 154. As such, a user must pivot stop valve control handle 316 to the actuated position in order to open stop valve 312, as heretofore described. With stop valve 312 in the open position, dampening cylinder 152 operates in a conventional manner as heretofore described. In the event of an emergency situation, the release of stop valve control handle 316 closes stop valve 312 and prevents the further movement of rails 70a and 70b.

With rails 70a and 70b in the second position, stop valve control handle 316 is released and returns to its non-actuated position such that container 12 may be loaded or unloaded in a conventional manner by a user, FIG. 2. Upon completion of such tasks, handle 240 is moved between the first non-release position to the release position so as to allow inner rails 20a and 20b to pivot to the second position, FIG. 3. Container is slid from roller sets 232 and 234 onto roller sets 67 and lower conveyor 66. Container 12 is thereafter transported by a conveyor or other suitable means to a different locale within a factory.

With container 12 deposited on lower conveyor 16, counterweights 282 urge inner rails 220a and 220b toward the first position, as heretofore described, with inner rails 220a and 220b in the first position, handle 220 is returned to the non-release position such that the pin structure 80 is mounted onto lower surface 250 of cross beam to interconnect rails 220a and 220b to corresponding rails 70a and 70b. Thereafter, counterweight 86 urges rails 70a and 70b toward the first position, FIG. 4. However, with stop valve control handle 316 in the non-actuated position, the positions of rails 70a and 70b are maintained. Upon pivoting of stop valve control handle 316 from the non-actuated to the actuated position, stop valve 312 is opened and dampening cylinder 152 functions as heretofore described. As a result, counterweight 86 urges rails 70a and 70b toward the first position, FIG. 4. The rate of which rail 70a and 70b move from the second position, FIG. 3, to the first position, FIG. 4, is controlled by cylinder assembly 310, and more specifically, by first and second flow control valves 192 and 194, respectively. With rails 70a and 70b in the first position, FIG. 4, handle 132 is released and returns to the non-release position, FIG. 9, such that pin structures 80 mounted to crossbeam 90 interconnect rails 70a and 70b to corresponding upper beams 24a and 24b, respectively. It can be appreciated that the operation heretofore described may be repeated.

Various modes of carrying out the invention are contemplated as being within the scope of the following claims particularly pointing out and distinctly claiming the subject matter that is regarded as the invention.

What is claimed is:

1. A dampening cylinder, comprising:
   a cylindrical housing having first and second ends and an inner surface defining a cavity in the housing for receiving a fluid therein;
   a piston slidably extending through the cavity in the housing;
   a flange projecting from the piston and positioned within the cavity so as to divide the cavity in the housing into first and second portions, the flange terminating at a radially outer edge which forms a slidable interface with the inner surface of the housing; and
   a flow conduit having a first end communicating with the first portion of the cavity in the housing and a second end communicating with the second portion of the cavity in the housing, the flow conduit including:
      first and second flow control valves for controlling the flow of fluid between the first and second portions of the cavity in the housing, each flow control valve including a flow regulator having a plurality of user selectable discrete settings for controlling the flow rate and for providing a discrete metered fluid flow through a corresponding flow control valve; and
      an emergency stop valve movable between a first open position wherein fluid is allowed to flow between the first and second portions of the cavity in the housing and a closed position wherein fluid is prevented from flowing between the first and second portions of the cavity of the housing.

2. The dampening cylinder of claim 1 wherein the first flow control valve includes first and second orifices interconnected by first and second parallel flow paths.

3. The dampening cylinder of claim 2 wherein the flow regulator of the first flow control valve is movable between a first retracted position wherein the flow regulator of the first flow control valve is removed from the first flow path and a second extended position wherein the flow regulator of the first flow control valve extends into the first flow path.

4. The dampening cylinder of claim 3 wherein the first flow control valve includes a check valve disposed in the second flow path, the check valve allowing the flow of fluid through the second flow path in a first direction and preventing the flow of fluid through the second flow path in the second direction.

5. The dampening cylinder of claim 4 wherein the second flow control valve includes first and second orifices interconnected by first and second parallel flow paths.

6. The dampening cylinder of claim 5 wherein the first and second flow control valves are connected in series.

7. The dampening cylinder of claim 6 wherein the flow regulator of the second flow control valve is movable between a first retracted position wherein the flow regulator of the second flow control valve is removed from the first flow path of the second flow control valve and a second extended position wherein the flow regulator of the second flow control valve extends into the first flow path of the second flow control valve.

8. The dampening cylinder of claim 1 further comprising a handle operative connected to the emergency stop valve, the handle allowing a user to move the emergency stop valve between the open and closed positions.

9. A dampening cylinder, comprising:
   a cylindrical housing having first and second ends and an inner surface defining a cavity in the housing for receiving a fluid therein;
   a piston slidably extending through the cavity in the housing;
   a flange projecting from the piston and positioned within the cavity so as to divide the cavity in the housing into first and second portions, the flange terminating at a radially outer edge which forms a slidable interface with the inner surface of the housing;
   a first conduit having a first end communicating with the first portion of the cavity in the housing and a second end;
   a second conduit having a first end communicating with the second portion of the cavity in the housing and a second end; and
   a control valve structure disposed between the first and second conduits for controlling the flow of fluid between the first and second portions of the cavity in the housing, the control valve structure includes first and second flow control valves in series between the first and second conduits; and
   an emergency stop valve in fluid communication with the fluid flow between the first and second portions of the cavity in the housing and being movable between a first open position for allowing slidable movement of the piston within the housing and a closed position for preventing slidable movement of the piston in the housing.

10. The dampening cylinder of claim 9 wherein the first flow valve includes first and second orifices interconnected by first and second parallel flow paths, the first orifice communicating with the first portion of the cavity through the first conduit.

11. The dampening cylinder of claim 10 wherein the first flow control valve includes a flow regulator having a plurality of user selectable settings and being movable into the first flow path, the flow regulator providing a discrete metered fluid flow through the first flow path.

12. The dampening cylinder of claim 11 wherein the first flow control valve includes a check valve disposed in the second flow path, the check valve allowing the flow of fluid through the second flow path in a first direction and preventing the flow of fluid through the second flow path in a second direction.

13. The dampening cylinder of claim 12 wherein the second flow control valve includes a flow regulator having a plurality of user selectable settings and being movable into the first flow path of the second flow control valve, the flow regulator providing a discrete metered fluid flow through the first flow path.

14. The dampening cylinder of claim 13 wherein the second flow control valve includes a check valve disposed in the second flow path of the second flow control valve, the check valve of the second flow control valve allowing the flow of fluid through the second flow path of the second flow control valve in the second direction and preventing the flow of fluid through the second flow path of the second flow control valve in the first.

15. The dampening cylinder of claim 9 further comprising a handle operative connected to the emergency stop valve, the handle allowing a user to move the emergency stop valve between the open and closed positions.

16. A dampening cylinder, comprising:
 a cylindrical housing having first and second ends and an inner surface defining a cavity in the housing for receiving a fluid therein;
 a piston slidably extending through the cavity in the housing;
 a flange projecting from the piston and positioned within the cavity so as to divide the cavity in the housing into first and second portions, the flange terminating at a radially outer edge which forms a slidable interface with the inner surface of the housing;
 first and second flow control valves for controlling the flow of fluid between the first and second portions of the cavity in the housing, each flow control valve including a flow regulator having a plurality of user selectable discrete settings for controlling the flow rate therethrough;
 an emergency stop valve in fluid communication with the fluid flow between the first and second portions of the cavity in the housing and being movable between a first open position for allowing the flow of fluid between the first and second portions of the cavity in the housing and a closed position for preventing the flow of fluid between the first and second portions of the cavity in the housing; and
 a handle operative connected to the emergency stop valve for allowing a user to move the emergency stop valve between the open and closed positions.

17. The dampening cylinder of claim 16 wherein the first flow control valve includes first and second ends interconnected by first and second parallel flow paths, the first end communicating with the first portion of the cavity.

18. The dampening cylinder of claim 17 wherein the first flow control valve includes a flow regulator having a plurality of user selectable settings and being movable into the first flow path, the flow regulator providing a discrete metered fluid flow through the first flow path.

19. The dampening cylinder of claim 18 wherein the first flow control valve includes a check valve disposed in the second flow path, the check valve allowing the flow of fluid through the second flow path in a first direction and preventing the flow of fluid through the second flow path in a second direction.

20. The dampening cylinder of claim 19 wherein the second flow control valve includes a flow regulator having a plurality of user selectable settings and being movable into the first flow path of the second flow control valve, the flow regulator providing a discrete metered fluid flow through the first flow path.

21. The dampening cylinder of claim 20 wherein the second flow control valve includes a check valve disposed in the second flow path of the second flow control valve, the check valve of the second flow control valve allowing the flow of fluid through the second flow path of the second flow control valve in the second direction and preventing the flow of fluid through the second flow path of the second flow control valve in the first direction.

* * * * *